J. F. SANDBERG.
ROLLING MILL.

No. 252,523. Patented Jan. 17, 1882.

Witnesses:
Sigfrid Lindhagen
Alex F. Roberts

Inventor:
Joseph F. Sandberg
by A. W. Almqvist
Attorney

4 Sheets—Sheet 2.

J. F. SANDBERG.
ROLLING MILL.

No. 252,523. Patented Jan. 17, 1882.

Witnesses:
Sigfrid Lindhagen.
Alex F. Roberts

Inventor:
Joseph F. Sandberg
by A. W. Almqvist
Attorney

J. F. SANDBERG.
ROLLING MILL.

No. 252,523.   Patented Jan. 17, 1882.

Witnesses:
Sigfrid Lindhagen
Alex F. Roberts

Inventor:
Joseph F. Sandberg
by A. W. Almqvist
Attorney

UNITED STATES PATENT OFFICE.

JOSEPH F. SANDBERG, OF NEW YORK, N. Y., ASSIGNOR OF ONE-THIRD TO CARL ISRAEL QVARNSTRÖM, OF DONOVAN, ILLINOIS.

ROLLING-MILL.

SPECIFICATION forming part of Letters Patent No. 252,523, dated January 17, 1882.

Application filed December 30, 1879.

*To all whom it may concern:*

Be it known that I, JOSEPH FERDINAND SANDBERG, of New York, in the county of New York and State of New York, have invented a new and useful Improved Rolling-Mill, of which the following is a specification.

The object of this invention is to furnish rolling-mills so constructed that a bar may be rolled and reduced to any desired thickness and width by the use of only two pairs of smooth rollers, thereby greatly economizing space, expense, attendants, and machinery, as compared with rolling-mills heretofore in use.

My invention consists in certain improvements in the arrangement and construction of the parts in that class of rolling-mills in which two pairs of rollers are employed, as hereinafter more fully set forth, and pointed out in the claims.

Figure 1:
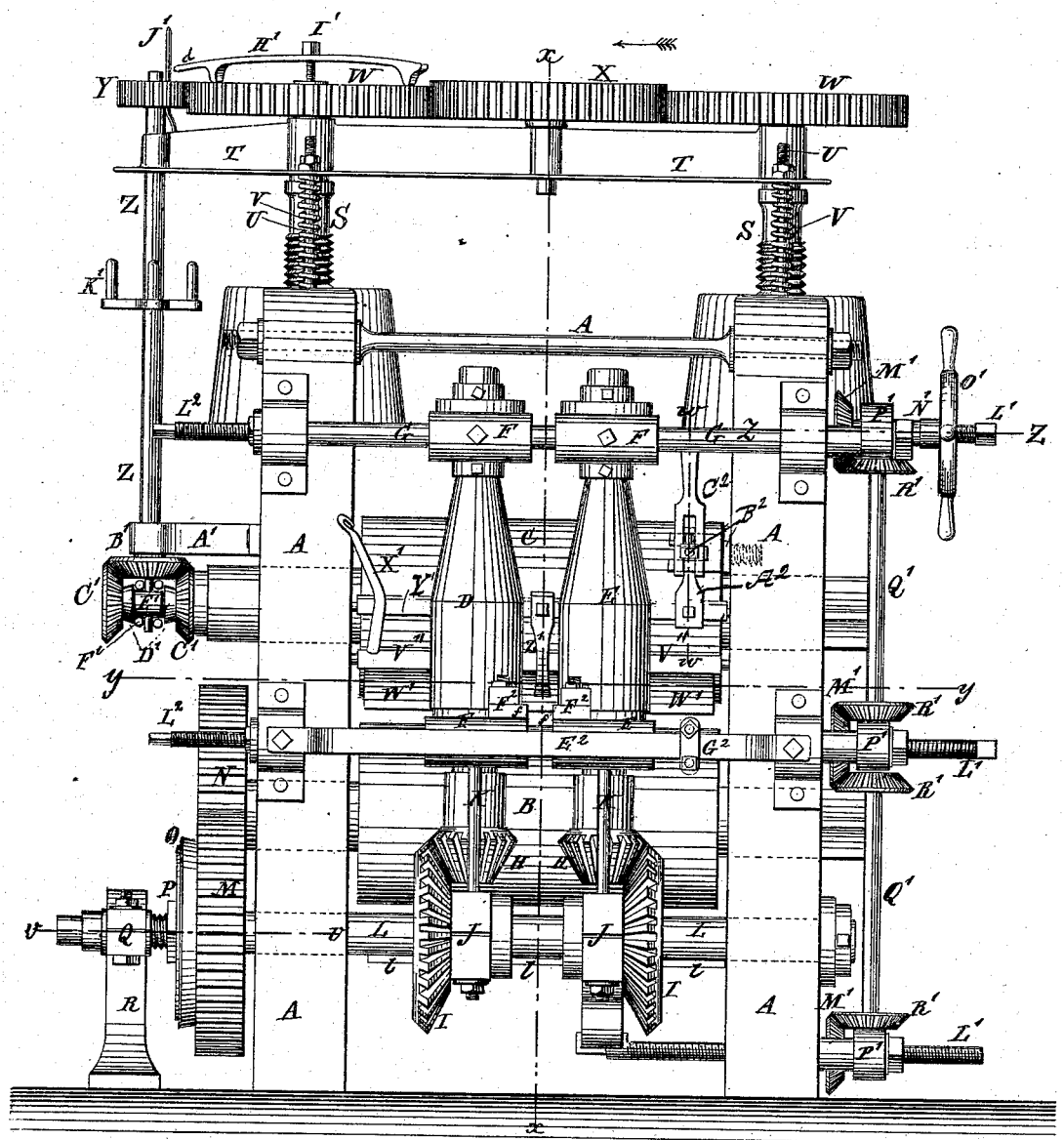
Figure 2:
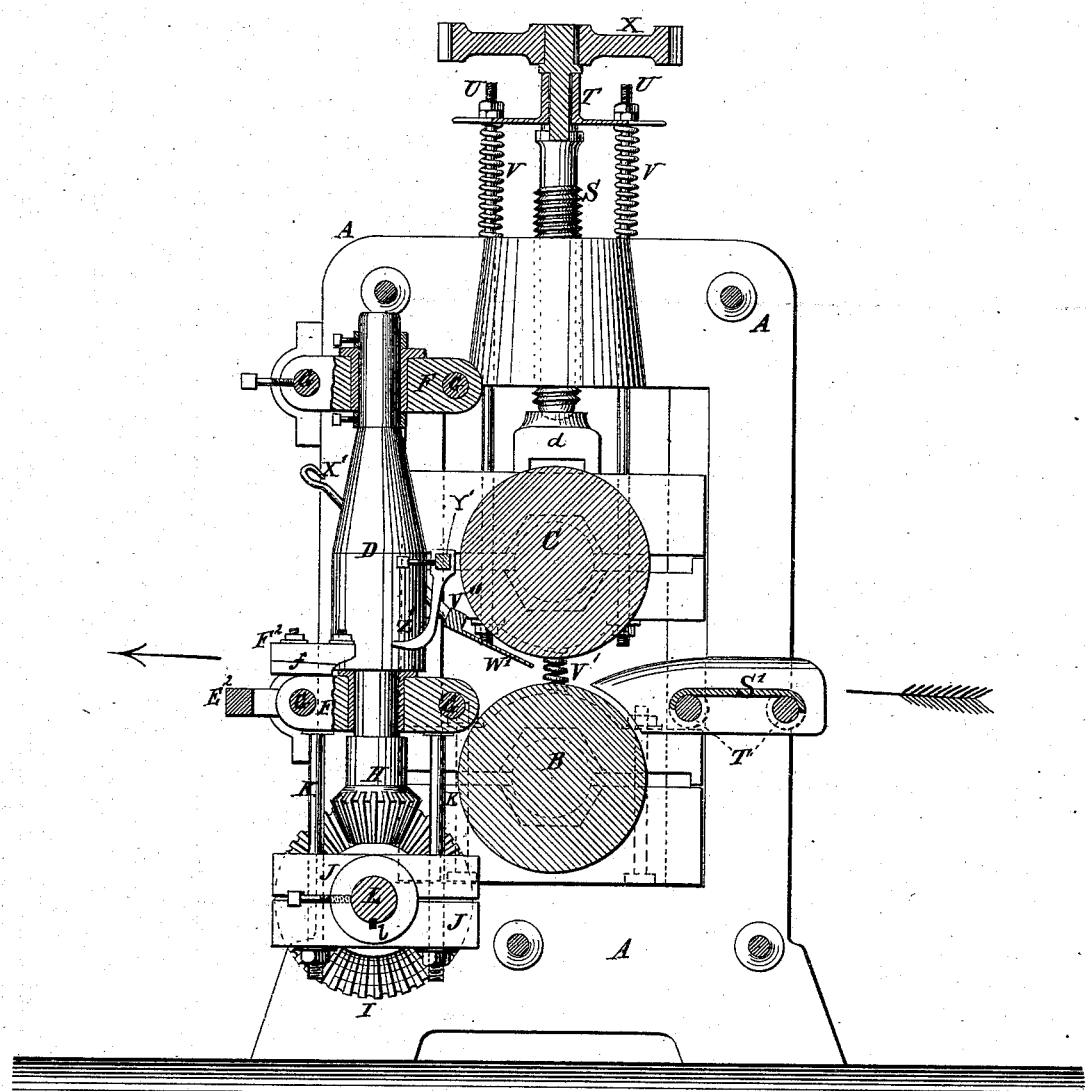
Figure 3:
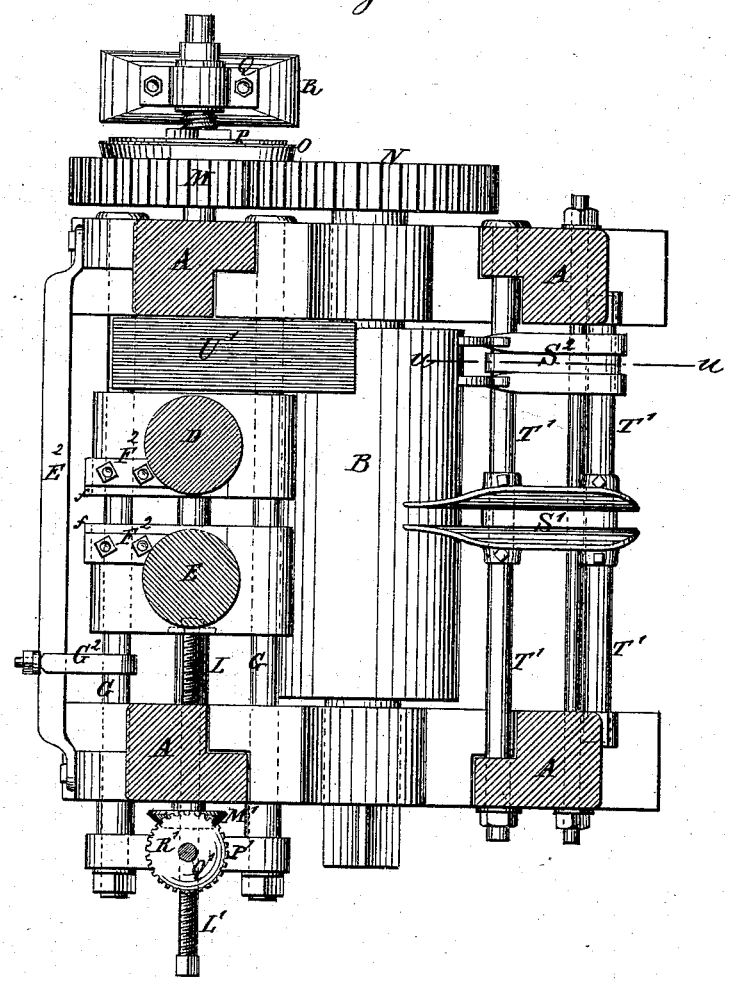
Figure 4:
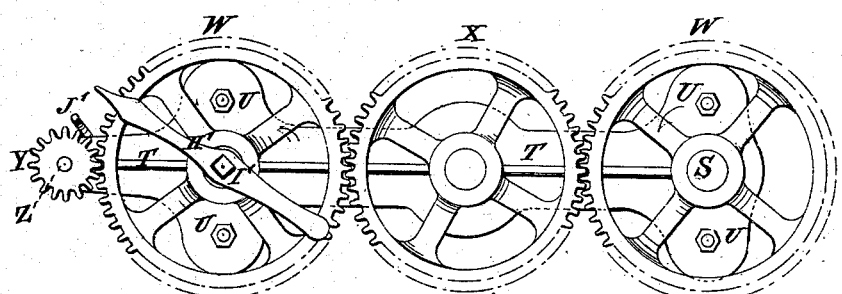
Figure 5:
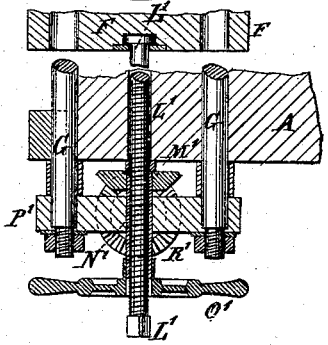
Figure 6:
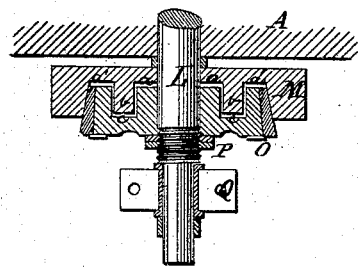
Figure 7:
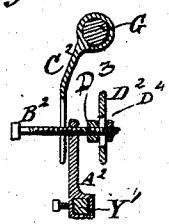
Figure 9:
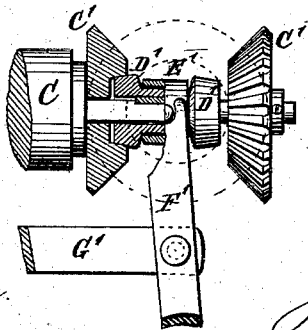
Figure 8:

In the accompanying drawings, Figure 1, Sheet 1, is a front elevation of my improvement. Fig. 2, Sheet 2, is a sectional side elevation taken through the line $x\ x$ of Fig. 1. Fig. 3, Sheet 3, is a sectional plan view taken through the line $y\ y$ of Fig. 1. Fig. 4, Sheet 4, is a plan view of the adjusting-gearing. Fig. 5, Sheet 4, is a sectional view taken through the line $z\ z$ of Fig. 1. Fig. 6, Sheet 4, is a sectional view taken through the line $v\ v$ of Fig 1. Fig. 7, Sheet 4, is a sectional view taken through the line $w\ w$ of Fig. 1. Fig. 8, Sheet 4, is a sectional view taken through the line $u\ u$ of Fig. 3. Fig. 9, Sheet 4, is a detail view, partly in section, of the bevel-gear wheels and their clutch.

Similar letters of reference indicate like parts.

A represents the frame of the machine.

B C are the main or horizontal rolls, the journals of which revolve in adjustable bearings in the frame A, and which are connected to receive rotary motion from water or steam power, as usual.

D E are two upright rolls placed a little in front of the horizontal rolls B C. The journals of the rolls D E work in bearings F, where they are secured against longitudinal movement by collars and set-screws attached to the upper journals, above and below the said bearings, as shown in Figs. 1 and 2. In the front and rear parts of the bearings F are formed holes to receive the rods G, the ends of which are attached to the frame A, so that the bearings F, and with them the rolls D E, may be adjusted farther apart or closer together, as required. The bearings F, when adjusted, may be secured in place upon the rods G by set-screws, as shown in Figs. 1 and 2.

To the lower journals of the rolls D E are attached bevel-gear wheels H, the teeth of which mesh into the teeth of the bevel-gear wheels I, whose hubs revolve in bearings J, which are connected with the lower bearings, F, by pairs of rods or bolts K, to give firmness to the said bearings F J. The hubs of the bevel-gear wheels I are bored to fit upon the counter-shaft L, and the bores of the hubs are grooved to fit upon a feather or spline, $l$, secured longitudinally upon said shaft, so that the gear-wheels I may slide upon the shaft L, but will be carried with it in its revolution. The shaft L revolves in bearings in the frame A, and upon it, at the outer side of the frame A, is placed a gear-wheel, M, the teeth of which mesh into the teeth of the gear-wheel N, attached to the journal of the roll B, so that the rolls D E may be driven by the same power which drives the rolls B C. The gear-wheel M is connected with the shaft L by a conical friction clutch, O, which is connected with the shaft L by a spline or other suitable means, and is held against the gear-wheel M by lock-nuts P, placed upon a screw-thread cut upon the projecting part of the shaft L. The gear-wheel M is provided with two concentric grooves, $a\ a'$, with a circular flange, $b$, between them, which projects into a circular groove, $c$, in the clutch O, as seen in Fig. 6, to interlock with each other and make the connection firmer. The projecting outer end of the shaft L revolves in a bearing, Q, attached to a standard or other support, R, so that the said shaft may be firmly supported against the strain of the gear-wheels M N.

The bearings of the upper roll, C, are each provided with a block, $d$, (see Fig. 2,) resting on the top of its bearing, and provided with a circular cavity, which receives one of the rounded ends of two screws, S, which pass through screw-holes in the top bars of the frame A.

The upper parts of the screws S pass through bearings in a flanged bar, T, the flanges of which have holes formed through them to receive the rods U, which pass through the top bars of the frame A, and are attached to the bearings of the upper roll, C. Upon the rods U are placed spiral springs V, upon which the flanges of the bar T rest, and which are made of sufficient strength to press the flanges of the bar T up against the nuts on the upper ends of the rods U, and to assist in raising the bearings of the top roll, C, when the screws S are turned up and to hold the flanged bar T from rocking, while allowing it to move up and down as the screws S are turned up and down. The springs V are assisted in raising the bearings of the top roll, C, by springs V′, interposed between the bearings of the two rolls B C, as shown in Fig. 2. To the upper ends of the screws S are attached gear-wheels W, the teeth of which mesh into the teeth of the intermediate gear-wheel, X, journaled in the flanged bar T, so that the wheels W may turn together and in the same direction when power is applied to one of them. The teeth of one of the gear-wheels W mesh into the teeth of a small gear-wheel, Y, attached to the upper end of a vertical shaft, Z, the upper part of which revolves in a bearing in the end of the flanged bar T. The lower part of the shaft Z revolves in a bearing in the end of an arm or bracket, A′, attached to the frame A.

To the lower end of the shaft Z is attached a small bevel-gear wheel, B′, the teeth of which mesh into the teeth of two small bevel-gear wheels, C′, which run loose upon the projecting end of the journal of the upper roll, C.

Upon the journal of the roll C, between the gear-wheels C′, is placed a double clutch, D′, which is splined to the journal of the roll C, so that it may be carried around by and with the said roll in its revolution, and may be slid upon the said journal to throw it into gear with either of the gear-wheels C′, as may be required. With this construction the screws S may be run up and down by the revolution of the roll C by throwing the clutch D′ into gear with one or the other of the gear wheels C′. The double clutch D′ has a groove formed around its middle part to receive a band, E′, which has pins attached to its upper and lower sides to receive the notched ends of the prongs of the forked lever F′, which is pivoted to an arm or bracket, G′, attached to the frame A, so that the clutch D′ can be readily adjusted as required by oscillating the lever F′ upon its fulcrum.

To the upper end of one of the screws S is attached a bar, H′, by a screw, I′, which has cross-ribs formed upon its lower side to rest upon the upper side of the gear-wheel W. The end of the bar H′ projects to form a pointer, d. J′ represents an arm attached to the flanged bar T and projecting above the pointer d. In raising or lowering the roll C, by means of the feed-screws S, operated by the gears W X Y B′ C′ and double clutch D′, the pitch of the screws being known, the clutch is thrown into gear with one of the bevel-pinions C′, and the number of revolutions or parts of a revolution of the gear W requisite to raise or lower the roll C the desired distance is determined by the operator watching when the pointer has revolved opposite the arm J′, when the double clutch is thrown out of gear; or the pointer may be set at one-half or one-quarter of the circumference of the wheel W, or at any desired distance from the arm J′, the double clutch D′ being in gear, when the roll will be raised or lowered and the clutch thrown out of gear by the operator when the pointer comes opposite the arm J′, thus raising or lowering the roll C any desired distance.

To raise or lower the roll C a distance corresponding to the thickness to which the bar is intended to be compressed at any one passage through the mill, it is only necessary to throw the clutch D′ in contact with one or the other of the respective wheels C′, which will then transmit the motion of the roll C, by the wheel B′, shaft Z, and wheel Y, to the wheels W, and turn the screws S up or down a distance equal to the pitch of said screws for each revolution of the wheels W—that is to say, for each time the pointer d passes the stationary arm J′. One-fourth of a turn of the index H′ represents likewise a difference in elevation of one-fourth of the pitch, and the latter being known, the distance between the rolls B and C can thus be rapidly adjusted to a nicety.

To the shaft Z is attached a hand-wheel, K′, for adjusting the rolls B C by hand, if required, in which case the double clutch D′ is moved into a central position between the bevel-wheels C′, out of contact with either of them.

To the bearings F F J of roll E are swiveled the ends of the three screws L′, the middle one of which is threaded in opposite direction to the upper and lower ones, for a purpose hereinafter described, and which pass out through holes in the frame A, and fit into screw-threads in the hubs of the bevel-gear wheels M′.

To the hub of the upper gear-wheel M′ is attached the end of a sleeve, N′, to the outer end of which is attached a hand-wheel, O′.

In bearings P′, attached to the projecting ends of the rods G, or to other supports attached to the frame A, revolve the ends of two vertical shafts, Q′, to the end parts of which are attached bevel-gear wheels R′. The shafts Q′ are placed in line with each other, and the teeth of the bevel-gear wheels R′ mesh into the teeth of the bevel-gear wheels M′. By this construction, by turning the hand-wheel O′ the bevel-gear wheels M′ will be turned together to adjust the vertical rollers D E and their gear-wheels H I at a greater or less distance apart, as may be desired. It will be perceived that the hand-wheel O′ and the upper and lower bevel-gears M′ in the construction described turn in the same direction, and that the central or middle gear M' turns in an opposite direction, and hence the central screw L' must be threaded in an opposite direction to the threads on the upper and lower screws L' to effect the adjustment of the rollers D E. It will also be observed that two separate shafts, Q' Q', are employed in the construction in lieu of a single continuous one, because the central screw L' would be in the way of the passage of a single shaft. With this construction, by adjusting the rolls B C and D E at a greater or less distance apart before each rolling, bars may be successively reduced, by repeated operations between the same rolls, to any desired thickness and width without the necessity of using several pairs of rolls with circumferential grooves of various sizes, as heretofore. The lateral pressure of the bar operated upon against the vertical roll D and its bearings F is taken up by the stop-screws L² passing through the frame A opposite to the screws L', in axial line with the latter. By unscrewing the screws L² more or less and turning the screws L' forward an equal distance the rolls D E may both be moved opposite a yet unworn portion of the surface of the rolls B C, thus making the rolls last for a much longer time without replacing them or renewing them by turning.

S' is a guide placed upon rods T', attached to the frame A, for convenience in guiding the bars into proper position between the rolls B C when inserting them. The guide S' may be secured to the rods T' adjustably by set-screws or other suitable means, if desired. A second guide, S², may be secured to the end parts of the rods T' for guiding the bars between the end parts of the rolls B C when it is not desired to have them pass between the roll D E. In this case a plate or apron, U', may be placed upon the end parts of the rods G to receive the bars as they come out from between the rolls B C.

V'' represents a bar journaled in the sides of the frame, to which is secured a plate, W', projecting inwardly between the rollers B C.

To the bar V'' is secured a hand-lever, X', projecting outwardly, by means of which the bar V'' may be operated so as to cause the edge of the plate W' to be raised and lowered. When a bar of iron is passed between the rollers B C the edge of the plate W' is brought to bear against it as it passes from between the rollers, to prevent it from winding around the upper roll, until the end of the bar is caught under the curved end of the bar Z', which latter guides it upon the surfaces f between the side cleats, F². These cleats, by contact with the vertical edges of the issuing bar, prevent it from bending laterally.

To the frame A are pivoted the ends of a square bar, Y', which carries the said curved arm Z' for holding the bar down and preventing it from turning as it comes out from between the rolls B C to pass in the proper place and position between the rolls D E. The hub of the arm Z' is fitted to slide upon the bar Y, and is secured upon the latter by a set-screw, so that it may be adjusted to correspond with the adjustments of the rolls D E. To the pivoted bar Y' is also secured in the same manner an upwardly-projecting arm, A², through the upper end of which is threaded a screw, B², which also passes through a slot in an arm, C², attached to the rod G, and through a slot in a plate or arm, D², attached to the frame A, and is secured in any position in said slot by a jam-nut, D³, on one side of the plate D², there being a washer, D⁴, on the opposite side of the plate, as shown in Fig. 7, so that by loosening the jam-nut and turning the screw B² the bar Y' will be turned to raise or lower the curved arm Z', and when the latter is thus adjusted to correspond with the thickness of the bar being rolled the jam-nut is again tightened to keep the bar in position.

E² is a brace-bar having its ends bent inward and bolted to the frame A, as shown, so that the body of the bar projects in front of the bearings F of the upright rolls D E, and serves as support to the rear end of the bar as it comes from the rolls.

To the adjacent forward corners of the bearings F are attached guide-blocks F², to receive the bar as it comes from the rolls D E and keep it from bending laterally, as before mentioned.

G² is a strengthening-clip passed around the rod G and clamped by end plate and nuts to the bar E², and may be adjusted to serve as a stop for gaging the distance apart of the rolls D E.

It is evident that by arranging the position of the rolls D E relative to that of the rolls B C at any other than a right angle, a bar may be rolled into a more or less acute diamond shape of cross-section.

Having thus described my invention, I claim as new and desire to secure by Letters Patent—

1. The combination, with the horizontal rolls B C and vertical rolls D E, of the rock-shaft V'', plate W', lever X', and adjustable curved bar Z', substantially as described, and for the purpose set forth.

2. The combination, with the rolls B C, of the rock-shaft V'', plate W', lever X', adjustable curved bar Z', rolls D E, side cleats, F², and surfaces f between the side cleats, substantially as described, and for the purpose set forth.

The above specification of my invention signed by me this 3d day of July, 1879.

JOSEPH FERDINAND SANDBERG.

Witnesses:
A. W. ALMQVIST,
C. SEDGWICK.